US010766818B2

(12) United States Patent
Bullerjahn et al.

(10) Patent No.: US 10,766,818 B2
(45) Date of Patent: Sep. 8, 2020

(54) SUPPLEMENTARY CEMENTITIOUS MATERIAL MADE OF ALUMINIUM SILICATE AND DOLOMITE

(71) Applicant: HeidelbergCement AG, Heidelberg (DE)

(72) Inventors: Frank Bullerjahn, Leimen (DE); Maciej Zajac, Heidelberg (DE); Dominik Nied, Philippsburg (DE)

(73) Assignee: HConnect 2 GmbH, Heidelberg (DE)

( * ) Notice: Subject to any disclaimer, the term of this patent is extended or adjusted under 35 U.S.C. 154(b) by 26 days.

(21) Appl. No.: 16/095,159

(22) PCT Filed: May 23, 2017

(86) PCT No.: PCT/EP2017/062418
§ 371 (c)(1),
(2) Date: Oct. 19, 2018

(87) PCT Pub. No.: WO2017/202849
PCT Pub. Date: Nov. 30, 2017

(65) Prior Publication Data
US 2019/0144339 A1 May 16, 2019

(30) Foreign Application Priority Data
May 24, 2016 (EP) ..................................... 16171112

(51) Int. Cl.
C04B 28/04 (2006.01)
C04B 28/06 (2006.01)
C04B 7/13 (2006.01)
C04B 14/04 (2006.01)
C04B 7/12 (2006.01)
C04B 14/28 (2006.01)
C04B 20/04 (2006.01)
C04B 103/00 (2006.01)
C04B 111/00 (2006.01)
C04B 111/60 (2006.01)
C04B 103/12 (2006.01)
C04B 103/14 (2006.01)
C04B 103/20 (2006.01)
C04B 103/30 (2006.01)

(52) U.S. Cl.
CPC ................ C04B 28/04 (2013.01); C04B 7/12 (2013.01); C04B 7/13 (2013.01); C04B 14/041 (2013.01); C04B 14/28 (2013.01); C04B 20/04 (2013.01); C04B 28/065 (2013.01); C04B 2103/0088 (2013.01); C04B 2103/12 (2013.01); C04B 2103/14 (2013.01); C04B 2103/20 (2013.01); C04B 2103/302 (2013.01); C04B 2111/00637 (2013.01); C04B 2111/60 (2013.01); Y02W 30/92 (2015.05); Y02W 30/94 (2015.05)

(58) Field of Classification Search
CPC ........... C04B 7/12; C04B 7/13; C04B 14/041; C04B 14/28; C04B 20/04; C04B 28/04; C04B 28/065; C04B 2103/0088; C04B 2103/12; C04B 2103/14; C04B 2103/20; C04B 2103/302; C04B 2111/00637; C04B 2111/60
See application file for complete search history.

(56) References Cited

U.S. PATENT DOCUMENTS

| 5,108,510 | A | * | 4/1992 | Burge ..................... C04B 28/02 106/696 |
| 5,626,665 | A | | 5/1997 | Barger et al. |
| 6,569,541 | B1 | * | 5/2003 | Martin .................... C04B 28/14 106/617 |
| 9,212,092 | B2 | | 12/2015 | Herfort et al. |
| 2017/0267586 | A1 | | 9/2017 | Bullerjahn et al. |

FOREIGN PATENT DOCUMENTS

| DE | 2931733 A1 | 2/1981 |
| EP | 0397963 A1 | 12/2009 |
| EP | 2253600 A1 | 11/2010 |
| GB | 191401438 A | 7/1915 |
| WO | 2016082936 A1 | 6/2016 |

OTHER PUBLICATIONS

English Translation of International Preliminary Report on Patentability for PCT/EP2017/062418 dated Nov. 27, 2018.
International Search Report of PCT/EP2017/062418 with Written Opinion, dated Aug. 25, 2017.
Inta Barbane et al: "Low-Temperature Hydraulic Binders for Restoration Needs" Material Science and Applied Chemistry, vol. 28, No. 28, October 18, 2013, pp. 5-9.
G. Habert et al: "Clay Content of Argillites: Influence on Cement Based Mortars" Applied Clay Science 43 (2009), pp. 322-330.
L Lindina et al: "Formation of Calcium Containing Minerals in the Low Temperature Dolomite Ceramics" 5-TH Baltic Conference on Silicate Materials, IOP Conf. Series: Materials Science and Engineering 25 (2011), pp. 1-9, IOP Publishing Ltd.
M.J. Trindade et al: "Mineralogical Transformations of Calcareous Rich Clays With Firing: A Comparative Study Between Calcite and Dolomite Rich Clays From Algarve, Portugal" Applied Clay Science 42 (2009), pp. 345-355.

(Continued)

Primary Examiner — Anthony J Green
(74) Attorney, Agent, or Firm — Collard & Roe, P.C.

(57) ABSTRACT

This invention relates to a method for producing a supplementary cementitious material comprising the steps:
providing a starting material containing dolomite and aluminium silicate,
converting the starting material to the supplementary cementitious material by burning under reducing conditions in the temperature range of >700 to 1100° C. or by burning in the temperature range of 625 to 950° C. in the presence of a mineraliser,
and cooling the supplementary cementitious material. The invention further relates to a binder comprising cement and to the ground supplementary cementitious material.

25 Claims, No Drawings

(56) References Cited

OTHER PUBLICATIONS

Tobias Danner: "Reactivity of Calcined Clays", Doctoral Thesis, ISBN 978-82-471-4553-1, 2013 (Abstract).
A.L. Burwell: The Henryhouse Marlstone in the Lawrence Uplift, Pontotoc County, Oklahoma and Its Commercial Possibilituies, Mineral Report 28, Norman 1955, pp. 3-21.

* cited by examiner

SUPPLEMENTARY CEMENTITIOUS MATERIAL MADE OF ALUMINIUM SILICATE AND DOLOMITE

CROSS REFERENCE TO RELATED APPLICATIONS

This application is the National Stage of PCT/EP2017/062418 filed on May 23, 2017, which claims priority under 35 U.S.C. § 119 of European Application No. 16171112.2 filed on May 24, 2016, the disclosures of which are incorporated by reference. The international application under PCT article 21(2) was not published in English.

BACKGROUND OF THE INVENTION

This invention relates to the production of a novel pozzolanic and/or latent hydraulic supplementary cementitious material, also abbreviated as SCM in the following, and binders which contain said material mixed with cement, in particular Portland cement.

Cement, and in this case especially Portland cement, abbreviated OPC (ordinary Portland cement) in the following, is an important construction material on the one hand, but one that requires large amounts of energy and mineral raw materials to produce on the other hand. Hence there have been efforts for some time to reduce the energy and raw material needs, for example by using by-products and waste products.

Substituting Portland cement clinkers with SCMs is especially well-suited for achieving these goals. On the one hand, SCMs are frequently by-products and waste products and therefore reduce the raw material input. The most commonly used SCMs include granulated blast furnace slag and fly ash. On the other hand, lowering the clinker content in turn lowers the energy requirement for the production thereof, because SCMs require less energy to produce than clinkers.

However, by no means all by-products and waste products are suitable as SCMs. The pozzolanic or latent hydraulic reactivity may not be too low, as otherwise the properties of the construction material created from the cement and SCM will be negatively impacted. For example, calcined clay can only be used as an SCM if it has a high mineralogical purity; ideally consists of only one clay mineral. The aluminium oxide content and the $Al_2O_3/SiO_2$ ratio should be high. Moreover, activation by calcination requires staying within a narrow temperature window as well as the shortest possible calcination times (down to seconds). Because clay is highly absorptive and very fine, a large volume of liquefier is needed for concrete made out of cement and such a SCM in order to compensate for the increased water demand. Admixtures can be ad- and absorbed on the surface and in the clay interlayers, respectively, which makes it necessary to use larger amounts.

High-quality clays consisting of a few or only one phase are rare in actual practice and therefore too expensive because of the competition with other industry branches. However, with mixtures it is difficult to set an optimum calcination temperature, or to put it another way, the different optimum temperatures for different constituents make it impossible to activate the entire starting material. If the temperature is too low, insufficient volumes will be activated. At somewhat higher temperatures, only those phases that react at these lower temperatures will be activated, which in most cases is still too low a fraction. Although a sufficient fraction will generally be activated at medium temperatures, some fractions of the starting material will have already formed crystalline and therefore inert phases. Although (nearly) all fractions of the starting material will be activated at high temperatures, most fractions will have already formed inert crystalline phases. The various clay minerals have the following optimum calcination temperatures:

Serpentinite 400-500° C.,
Palygorskite 600-800° C.,
Kaolinite 600-800° C.,
Halloysite 600-800° C.,
Pyrophyllite 750-950° C.,
Montmorillonite 800-950° C.,
Illite 800-1000° C.,
Mica 650-1000° C.

Non-converted phases have an especially high water demand and therefore must be avoided as much as possible. Many starting materials also have too low an $Al_2O_3$ content, but considerable amounts of $SiO_2$ and other constituents such as $Fe_2O_3$, CaO, MgO, $Na_2O$ and $K_2O$. For these reasons, many clays cannot be used economically and in certain circumstances clay-containing or clay-rich materials therefore have to be dumped.

It has already been proposed to make such clays usable as SCMs by treating them hydrothermally or by calcining them mixed with limestone or by combining them with limestone; see for example EP 2 253 600 A1 and U.S. Pat. No. 5,626,665. In Tobias Danner's doctoral thesis, "Reactivity of calcined clays", ISBN 978-82-471-4553-1, it was demonstrated that limestone already present in the starting material or added thereto before burning does not have any influence on the reactivity of the calcined material. It was furthermore established in this study that the material with the highest MgO content originating from magnesium silicate compounds (i.e. not from magnesium carbonate or dolomite to dolomitic limestone) could not be sufficiently activated in order to be used as SCM, in other words had the least pozzolanic reactivity. This study also showed that the lime binding capacity (in other words the pozzolanic reactivity) of the materials studied reaches its maximum at burning temperatures of 700 to 800° C. and that even at temperatures slightly above 800° C., e.g., 850° C., the material loses a substantial amount of reactivity. In other words, higher temperatures led to materials with only very low to even no reactivity at all. Consequently, this method was unable to solve the problems associated with clays with mixed phases, which require very different calcination temperatures. The study furthermore did not reveal any positive effect of the dolomite present in minute concentrations, as the latter had not been added in sufficient quantities and the burning temperatures used were also too low. From this study, a person skilled in the art cannot infer a synergistic effect of the calcination of dolomite to dolomitic limestone in combination with a clay, nor a use of the material thus obtained as an SCM.

Dolomite is another material that cannot be used for cement clinker production, nor as a SCM. MgO can only be incorporated in Portland clinkers in a concentration of up to a few percent; a fraction in excess of that is present in the raw meal as "dead-burned" MgO after burning. Such MgO reacts very slowly, to a large extent years later, with water, but then forms $Mg(OH)_2$, which has a larger volume than MgO and thus destroys the hardened cement. Nor may dolomite be used as an SCM in every case because it partially dissolves, thus releasing $CO_2$ and forming $Mg(OH)_2$ under certain circumstances. The $CO_2$ in turn forms calcite from $Ca^{2+}$. These reactions likewise lead to a volume change, which can in turn lead to crack formation and destruction of the hardened cement.

An approach for rendering dolomite (and limestone) useful is a burning for direct use as air hardening lime/caustic lime/slaked lime or as a hydraulic binder, e.g. as so-called Roman cement. Various authors have studied the reaction products of calcination of clays with a lime or dolomite content or of mixtures of clay and limestone and/or dolomite, but only with a view towards a use of the products as a hydraulic binder or the production of ceramics. See A. L. Burwell, Mineral Report 28 in "The Henryhouse Marlstone in the Lawrence Uplift, Pontotoc County, Okla. and its Commercial Possibilities" and M. J. Trindade et al., "Mineralogical transformations of calcareous rich clays with firing: A comparative study between calcite and dolomite rich clays from Algarve, Portugal", Applied Clay Science 42, (2009), pp. 345-355. A suitability as SCMs is not addressed in these works, and comparative studies have furthermore shown that it is not practical for the majority of the products.

Another study on rendering low-quality clay material useful as SCMs also involves an MgO-rich raw material that contains dolomite in traces, see G. Habert, "Clay content of argillites: Influence on cement based mortars", Applied Clay Science 43 (2009) 322. The predominant MgO fraction is not bound in the dolomite, but present in the form of clay minerals (palygorskite and montmorillonite: Σ 69%). Only a small calculated fraction of less than 1% MgO may be present as carbonate, which corresponds to a maximum amount of 5% pure dolomite. The study also shows that burning temperatures above 800° C. lead to a substantial reduction of reactivity, or rather that the material was only present as an inert filler afterwards.

GB 1438 A proposes the production of a pozzolan from argillaceous materials and calcareous dolomite or magnesian material. The material should be burned at a temperature at which no sintering will take place. The absence of sintering means that the existing compounds such as CaO, MgO or the existing mixture of $SiO_2$ and $Al_2O_3$ (see also metakaolin) may not react any further and/or with each other. This becomes necessary in order to prevent the crystallization of new, more complex phases and thereby ensure that the material is as reactive as possible. Adding salts such as sodium chloride should result in decarbonation without sintering, during which synthetic pozzolans will be obtained. The ratio of the argillaceous, dolomitic or magnesium-rich material to the argillaceous constituent should correspond to systems of Roman cements. According to standard practice and definition, the clay fraction is thus 10% to 15%, or at a maximum below 30%.

Another study (I. Barbane et al. 2013, "Low-temperature Hydraulic Binders for Restoration Needs", Material Science and Applied Chemistry, Vol. 28) describes the production and the material properties of a hydraulic limestone based on dolomite and clay. The goal is to produce a system with a maximum amount of dolomite and the lowest possible clay contents. The strength developing reaction is mainly attributed to the hydration of CaO and MgO for conversion to $Ca(OH)_2$ and $Mg(OH)_2$, and also, but to a lesser extent, to a pozzolanic reaction. According to this document, higher clay contents and correspondingly lower dolomite or limestone contents are not sought, as this would lead to reduced strength development. A combination with, say, OPC is neither indicated nor deemed advantageous by a person skilled in the art because, for example, the hydration of OPC produces large quantities of $Ca(OH)_2$.

Another study (L. Lindina et al. 2006, "Formation of calcium containing minerals in the low temperature dolomite ceramics", Conference on Silicate Materials, Materials Science and Engineering, Vol. 25) describes the production and use of a hydraulic binder based on natural mixtures of limestone, dolomite, and clay. The study shows that the optimum burning temperature is around 750° C. Reactivity is substantially reduced even at 800° C. For a person skilled in the art, this leads to the conclusion that burning temperatures lower than 800° C. should be sought. A combination with, say, OPC is neither indicated nor deemed advantageous by a person skilled in the art.

In the studies cited, use is made of mixtures with the greatest possible quantity (at least more than 70%, typically more than 80%) of limestone or in rare cases dolomite and only small quantities (less than 30%, typically less than 20%) of clay material. In combinations with OPC, the material produced according to these methods does not lead to an improvement in strength development.

The pozzolanic activity of other natural and synthetic materials which, like pozzolans, contain aluminium silicate, is also (too) low for use as SCMs.

The not prior published document PCT/EP2015/002549 discloses that reactive SCMs can also be obtained from clay, argillaceous material, and low-quality pozzolans that are either not suitable or else poorly suited for other purposes by burning them in combination with dolomite or magnesium carbonate-containing materials. However, the SCMs thus obtained frequently exhibit a pronounced brown or red colouration.

Materials with a greyish or even white colouration are typically used for cement and concrete applications. A pronounced discolouration, for example reddening due to calcined clays or blueness in cements containing granulated blast furnace slag, is often perceived as disruptive. This rules out use in many applications. Hence there is still a need of materials or of methods for the activation of aluminium silicates, in particular of clay and argillaceous materials and other materials of low pozzolanic quality, in order to render them suitable as SCMs.

Surprisingly, it was found that reactive SCMs can also be obtained from clay, argillaceous material, and low-quality pozzolans that are either not suitable or else poorly suited for other purposes, and that a brown or red colouration can be avoided, by burning them in combination with dolomite or magnesium carbonate-containing materials under reducing conditions. In addition, another technical advantage arises from the fact that the decomposition of phases takes place at even lower temperatures under reducing conditions. The material can thus be produced with even greater energy savings.

SUMMARY OF THE INVENTION

The invention thus solves the aforementioned object by a method of producing a supplementary cementitious material in which a starting material, which contains an aluminium silicate constituent and a dolomite constituent, is provided and burned in the temperature range of >700° C. to 1100° C. max. under reducing conditions. The object is furthermore solved by a binder that contains cement and the supplementary cementitious material according to the invention. Another advantage arises from the fact that the phases containing, for example, water as well as carbonate decompose at lower temperatures and the elements thus released can react to form new products if they are burned under reducing conditions. It was further found that burning under reducing conditions can provide more reactive materials than burning under oxidizing conditions.

According to the invention, a reactive SCM is obtained from aluminium silicate and dolomite such that high quality materials can be even further improved on the one hand, and as a particular advantage, materials that are otherwise unusable or only usable with difficulty can be advantageously exploited. The starting material is either provided naturally or created in a targeted manner by mixing and if applicable combined grinding, burned in the temperature range of >700 to 1100° C., cooled, and if applicable ground.

In order to simplify the further description, the following standard cement industry abbreviations are used: H—$H_2O$, C—CaO, A-$Al_2O_3$, F—$Fe_2O_3$, M—MgO, S—$SiO_2$ and $-SO_3$. Furthermore, compounds will in most cases be listed in their pure form, without explicit mention of solid solution series/substitution by foreign ions, etc., as is normally the case in technical and industrial materials. As any person skilled in the art understands, the composition of the phases mentioned by name in this invention can vary due to substitution with diverse foreign ions, depending on the chemistry of the starting material and the type of production, wherein such compounds are also the subject of this invention and, unless stated otherwise, are encompassed by the phases mentioned in pure form.

Unless stated otherwise, "reactive" means hydraulic, latent hydraulic, or pozzolanic reactivity. A material is hydraulically reactive if it hardens by hydration in finely ground form after being mixed with water, the hardened product retaining its strength and durability in air and under water. A material possesses latent hydraulic reactivity if it is capable of hardening hydraulically after being mixed with water, but requires activation for a conversion to take place within a technological and/or economically useful time period. A material is pozzolanically reactive if, after being mixed with water at room temperature, it can only harden if an activator, e.g., an alkaline hydroxide or calcium hydroxide, is added. $OH^-$ acts on the $Al_2O_3$—$SiO_2$ network in such a way that bonds between oxygen and network atoms are broken, giving rise to calcium silicate hydrates (C—S—H) or calcium aluminate hydrates (C-A-H) as firmness-forming phases. Because many materials have both types of reactivity, a sharp distinction between latent hydraulic and pozzolanic reactivity is often not made.

DETAILED DESCRIPTION OF THE INVENTION

In the context of this invention, clinker means a sintering product which is obtained by burning a starting material at elevated temperature and which contains at least one hydraulically reactive phase. Burning means activation through changes in one or several of the properties of chemistry, crystallinity, phase composition, three dimensional array and binding behaviour of the structural atoms induced by applying thermal energy. In isolated cases the starting material can also be a single raw material if the latter contains all desired substances in the right proportion, but this is an exception. The starting material can also contain mineralisers. Substances that act as flux agents and/or lower the temperature, which is necessary for forming a melt, and/or substances that catalyse the formation of the clinker compound, for instance through mixed crystal formation and/or phase stabilization, are known as mineralisers. Mineralisers may be contained in the starting material as constituents or selectively added thereto.

"Cement" designates a clinker ground with or without other constituents added, and also other hydraulically hardening materials and mixtures including, but not limited to supersulphated cement, geopolymer cement, and belite cement obtained by hydrothermal conversion. A material that hardens hydraulically upon contact with water and that contains cement and typically, but not necessarily, other finely ground constituents is known as a binder or binder mixture. The binder is used after adding water, and usually also aggregates and if applicable admixtures.

A pozzolanic and/or latent hydraulic material that replaces at least a portion of the clinker in a cement or binder is referred to as a supplementary cementitious material or SCM. Latent hydraulic materials have a composition that enables hydraulic hardening upon contact with water, wherein an activator is typically necessary for a hardening within technologically useful time periods. A material that accelerates the hardening of latent hydraulic materials is known as an activator. Activators can also be additives, for instance sulphate or calcium (hydr)oxide, and/or products of the hydraulic reaction of the cement, for example, as calcium silicates harden, they release calcium hydroxide, which acts as an activator. In contrast, pozzolans or pozzolanic materials are natural or industrially-produced substances, for example lime-deficient fly ashes which contain reactive $SiO_2$ alone or in combination with $Al_2O_3$ and/or $Fe_2O_3$, but which are not capable of hardening with water on their own by forming calcium(aluminium) silicate hydrate and/or calcium aluminate(ferrate) phases. Pozzolans contain either no or only very little CaO. In contrast to latent hydraulic materials, they therefore require CaO or $Ca(OH)_2$ to be added in order for a hydraulic hardening based on the formation of calcium silicate hydrates to take place. The supplementary cementitious material or SCM itself can also constitute a hydraulic material if it contains sufficient quantities of free lime and periclase and/or reactive clinker phases together with pozzolanic or latent hydraulic materials. In actual practice the borders among hydraulic, latent hydraulic, and pozzolanic materials are often blurred, for example, fly ashes can often be anything from pozzolanic, latent hydraulic, to hydraulic materials, depending on the mineralogy and the calcium oxide content. By SCM are meant latent-hydraulic as well as pozzolanic materials. A distinction must be made between SCMs and non-reactive mineral additives such as rock flour, which do not play any role in the hydraulic conversion of the binder. In the literature, SCMs are sometimes grouped together with such additives as mineral additives.

A clinker can already contain all necessary or desired phases and can be used directly as a binder after having been ground into cement. The composition of the binder is often obtained by mixing cement and other constituents, according to the invention at least the supplementary cementitious material, and two or a plurality of clinkers and/or cements are also possible. Mixing takes place before (or during) grinding and/or in the ground state and/or during the production of the binder. Unless explicit mention is made of a time point for the mixing, the following descriptions relate to binders (and cements) that are not limited in this respect.

According to the invention, a SCM is obtained by burning the mixture containing aluminium silicate and dolomite. A (highly) reactive SCM is thus obtained or even a clinker is generated from otherwise unexploitable or poorly exploitable materials that in the past were hardly of any use as construction materials. The substitution of cement clinkers results in savings in terms of raw materials for producing the same and above all energy, since the SCMs according to the invention require lower burning temperatures than cement clinkers for Portland cement or calcium sulphoaluminate cement.

Another surprising advantage is the rapid conversion of the MgO contained in the SCM according to the invention. The MgO is usually fully hydrated within the first 1 to 7 days, and after at most 28 days either no MgO or only traces (<1%) thereof are detectable. The material can also be adjusted such that autogenous shrinkage is at least partially offset by the conversion and volume increase of MgO to $Mg(OH)_2$ and a potential formation of shrinkage cracks is minimized or prevented. This process initiates in the first days of hydration and concludes at the latest with the complete conversion of MgO.

Calculated on a loss on ignition-free basis, the starting material should preferably contain at least 5 wt % MgO and at least 8 wt % $Al_2O_3$. Particularly preferably at least 7 wt % MgO, in particular at least 10 wt % MgO, and most preferably at least 12 wt % MgO are contained, wherein the (main) fraction of the MgO originates from the dolomite constituent, i.e. should be present as carbonate. At least 8 wt % $Al_2O_3$, preferably at least 15 wt % $Al_2O_3$, in particular at least 20 wt % $Al_2O_3$ is contained. Furthermore, at least 15 wt % $SiO_2$, preferably at least 25 wt % $SiO_2$ and in particular at least 40 wt % $SiO_2$ should be contained. Loss on ignition-free refers to samples that were calcined at 1050° C. Fraction calculated on a loss on ignition-free basis means the fraction that would result if materials calcined at 1050° C. were used.

For the sake of simplicity, mention shall be made of starting material, wherein this term encompasses materials created by mixing as well as materials that naturally contain the desired constituents in the needed amounts. Use is made of a mixture if a starting material does not contain the desired quantities of MgO, $Al_2O_3$ and $SiO_2$. As a rule, starting materials that contain 40 to 80 wt %, preferably 50 to 70 wt %, and in particular 55 to 65 wt % aluminium silicate constituents as well as from 20 to 60 wt %, preferably 30 to 50 wt %, and in particular 35 to 45 wt % dolomite constituents are well suited.

The weight ratio of $Al_2O_3+SiO_2$ to MgO+CaO of the starting material is preferably in the range of 0.7 to 6, more preferably in the range of 1.1 to 4, and in particular in the range of 1.5 to 2.9. In other words, in contrast to the raw material mixtures used for Roman cement, which as a rule use raw materials with a weight ratio of $Al_2O_3+SiO_2$ to CaO(+MgO) of <0.5, there should preferably be more aluminium silicate than dolomite in the starting material for the method according to the invention.

In the context of this invention, dolomite constituent means a material that contains calcium magnesium carbonate ($CaMg(CO_3)_2$). Materials with a calcium magnesium carbonate content of at least 20 wt %, in particular >50 wt %, and most preferably >80 wt % are suitable. Hence particular preference is given to the carbonate minerals dolomite and dolomitic limestone. Moreover, the dolomite constituents can contain other carbonates such as, e.g., magnesite, barring-tonite, nesquehonite, lansfordite, hydromagnesite, calcite, vaterite, ankerite, hun-tite, and aragonite. All materials of natural or synthetic origin that contain calcium magnesium carbonate in suitable quantities are suitable as dolomite constituents. In addition to calcium magnesium carbonate, preference is given to Mg- and/or Ca-containing carbonates that convert in the temperature range of 600 to 1000° C., preferably 700 to 950° C.

It is particularly favourable if the decomposition or rather conversion temperature of the dolomite constituent is adjusted to that of the aluminium silicate constituent. Hence it is favourable if the decomposition or rather conversion temperatures are approximately in the same range. For example, the decomposition/conversion of the dolomite constituent should take place at the same temperature or at a temperature up to 50° C. higher or preferably lower than that of the aluminium silicate constituent.

In the context of the invention, aluminium silicate refers to minerals and synthetic materials that contain $Al_2O_3$ and $SiO_2$. Minerals, natural by-products and waste products, and also industrial by-products and waste products that provide $SiO_2$ and $Al_2O_3$ in sufficient quantities and are at least partially hydrated and/or carbonated are suitable as aluminium silicate constituents. Calculated on a loss on ignition-free basis, the aluminium silicate constituents should contain more than 12 wt % $Al_2O_3$, preferably at least 20 wt % $Al_2O_3$, in particular at least 30 wt % $Al_2O_3$, as well as 25 to 65 wt % $SiO_2$, preferably 35 to 55 wt % $SiO_2$ and in particular between 40 and 50 wt % $SiO_2$. Loss on ignition-free refers to samples that were calcined at 1050° C. The aluminium silicate constituent typically contains representatives of various minerals such as, but not limited to, ones from the group consisting of clays, micas, amphiboles, serpentines, carpholites, staurolites, zeolites, allophanes, topazes, feldspars, Al- and Fe-containing hydroxides, and other natural pozzolans, laterites and saprolites. Use can also be made of aluminium silicate constituents with more than 40 wt % $Al_2O_3$. Particular preference is given to using low quality minerals, i.e. ones that are not suited or else only poorly suited for other purposes (e.g., "calcined clay" produced as a SCM according to the current prior art). Low quality material refers to aluminium silicates such as pozzolans and clays, which cannot be activated in sufficient quantity by a burning process in order to satisfy, for example, the quality requirements as defined for, say, fly ashes in EN 450-1. Low quality material is furthermore understood to mean materials consisting of complex mineral mixtures in which phases with markedly different optimum calcination temperatures occur together, for example. These materials are often a mix of phases, for example of different clay minerals, micas, and including, but not exclusively, other natural aluminium silicates and aluminium hydroxides with in part very different optimum temperatures for calcination. Where appropriate, use can also be made of synthetic starting materials provided that they have comparable compositions and properties. Furthermore, it was surprisingly found that even for materials of adequate quality (materials that constitute reactive pozzolans, either naturally or as a result of heat treatment in the temperature range of 600 to 900° C., and thus fulfil the criteria as defined in, e.g., EN 450-1 for fly ashes), the reactivity can be improved by the method according to the invention.

Particular preference is given to clay and clay-containing materials as aluminium silicate constituents. In the context of the invention, clay and clay-containing materials means materials that contain predominantly clay minerals, i.e. layered silicates with layers of $SiO_4$ tetrahedra and layers of $AlO_6$ octahedra. The tetrahedral and octahedral layers typically have other elements that are partially substituted for Si and/or Al. As a rule, clay and clay-containing materials are fine particle to ultra-fine particle materials with particle sizes of below 4 μm or below 2 μm or below 1 μm. However, this is not mandatory in the context of the invention, chemically and mineralogically equivalent materials with larger particle sizes can also be used. Clays can contain other materials, and clay-containing materials do contain such materials. In particular clays, clay-containing materials, and synthetic materials of similar structure which contain very different phases and which are either not reactive or else insufficiently reactive on their own profit from the invention.

In addition to mixtures of aluminium silicate constituents and dolomite constituents as described above, possible starting materials include marls (mixtures of clay and limestone/dolomite). As long as the latter have a sufficient content of MgO bound as carbonate, they are suitable as the sole raw material. On the other hand, marls with a high CaO content should be used only in small quantities so that the CaO content in the starting material, calculated on a Loss on ignition-free basis, is as low as possible. Preferred are 40 wt % at a maximum, in particular below 30 wt %, and especially preferred below 20 wt %.

Without wishing to be bound to this theory, it is assumed that during calcination under reducing conditions, dolomite and similarly composed materials are decomposed at lower temperatures than, e.g., limestone and thereby reactive silicates and aluminates can be made from silicon as well as aluminium, with either no or fewer inert crystalline phases (mullite, for example) forming as a result.

The temperature during burning ranges from >700 to 1100° C.; the mixture is preferably burned at 825 to 1000° C., especially preferred at 850 to 975° C. In contrast to the calcination of clays according to the prior art (in which maintaining a narrow temperature range is mandatory), very broad temperature ranges, including very high temperatures (>900° C.), can be used. Even at these high temperatures, the SCM still shows a very high reactivity, and surprisingly the highest reactivity in some cases.

If necessary, the starting material can be ground before burning and, in the case of starting material mixtures thoroughly mixed, for example by being ground together. However, it is also possible to use just crushed material. A starting material fineness of 2000 to 10,000 $cm^2/g$ (Blaine), preferably 3000 to 7000 $cm^2/g$, has proved to be advantageous. Particle sizes (laser granulometry) ranging from a $d_{90}$<200 μm, preferably $d_{90}$<100 μm, and especially preferred $d_{90}$<60 μm were well-suited. As any person skilled in the art knows, greater finenesses permit a more effective calcination (e.g., reduced burning temperature and/or reduced residence time and an increased phase conversion). However, the grinding of such complex mixtures (very soft materials (e.g., clay) with very hard materials (e.g., quartz)) is very difficult and frequently also leads to problems in the use as SCMs due to, for example, the considerably increased water demand. A particular advantage of the invention is the considerably increased flexibility towards higher temperatures. Even (very) coarse material is sufficiently converted, and the specific surface, and accordingly the water demand, is reduced considerably by the high burning temperatures (e.g., >900° C.).

All standard devices are suitable for burning, examples of which include, but are not limited to, directly or indirectly fired rotary kilns, fluidized-bed reactors, shaft kilns and multi-deck ovens, and flash calciners.

According to the invention, a reducing atmosphere must be established during the burning. Basically all measures for establishing a reducing kiln atmosphere are suitable. Examples of ways of achieving a reducing atmosphere include, but are not limited to, adding carbon, carbon monoxide, organic compounds, ammonia, sulphur, methane or other gases of the hydrocarbon group. Reducing conditions can also be established by process engineering, i.e. by choosing an appropriate quantity of fuels and/or by minimizing the oxygen input. It is also possible that the starting material may already contain constituents such as sulphides or organic compounds, for example, which create a reducing atmosphere during the burning process.

Examples of suitable fuels include oil, coal, bituminous coal, brown coal and black coal, natural gas and synthetic natural gas, solvents and in particular solvent waste, dried sewage sludge or dehydration sludge, paper sludge, anode dust, oil filter paper, oil sludge, oil waste, shredded car parts, tyres, shredded tyres or tyre chips, textile chips, paper pellets, soils, contaminated soils and mixtures thereof, secondary fuels from the waste industry (e.g., plastic waste), secondary fuels from the agricultural industry (e.g., rice husks, palm kernel oil or husks, sugarcane bagasse, coconut shells, shea nut shells, livestock feed, animal fat, millet husks, corn husks). Mixtures of or several of the aforementioned fuels are usually used in actual practice.

The conversion in devices such as, but not limited to, rotary kilns or shaft kilns and multi-deck ovens typically requires 5 to 240 minutes, preferably 25 to 120 minutes, and in particular 40 to 75 minutes and should be adjusted according to the device, the burning temperature, and the desired product characteristics. At higher temperatures, shorter times can also be advantageous if, for example, phases that will be destroyed at lower temperatures (e.g., kaolinite) predominate.

The conversion in devices such as, but not limited to, fluidized-bed reactors or flash calciners typically requires 5 to 300 seconds, preferably 10 to 150 seconds, and in particular 20 to 100 seconds and should be adjusted according to the device, the burning temperature, and the desired product characteristics.

It is possible to lower the required temperature further by adding one or several mineralisers, including but not limited to borax, waste glass, iron salts (e.g., sulphates, hydroxides, carbonates, fluorides, nitrates, or mixtures thereof), alkaline salts (e.g., sulphates, hydroxides, (bi)carbonates, fluorides, or mixtures thereof) and/or alkaline earth salts (e.g., sulphates, hydroxides, (bi)carbonates, fluorides, or mixtures thereof). The temperature to use then lies in the range of 625 to 950° C., preferably 675 to 900° C., in particular 800 to 875° C. Suitable compounds such as, e.g., calcium sulphate (e.g., as anhydrite or gypsum) and/or alkaline salts may in some cases already be present in the starting material.

The mineralisers are selected such that they promote the formation of reactive phases. These include clinker phases such as $N_yC_{4-y}A_{3-x}F_x\$$, CA, $C_{12}A_7$, $C_3A$, $C_2S$; reactive (calcium) alkali sulphates such as $K_2Ca_2(SO_4)_3$, $K_2SO_4$, $Na_2Ca(SO_4)_2$, $Na_2SO_4$, $K_3Na(SO_4)_2$ and calcium sulphate; as well as inert, magnesium-containing minerals in which magnesium oxide (released during dolomite decomposition) is bound, such as magnesium (aluminium, iron) silicates (e.g., forsterite, enstatite, spinel, etc.).

According to the invention, an important effect of the burning, particularly at temperatures above 700° C., preferably above 800° C., is a substantial reduction of the surface area of the aluminium silicate constituent. Through burning, the specific surface area (measured BET in $m^2/g$) of the aluminium silicate constituent decreases by at least 15%, preferably by at least 20%, and in particular by 30%. 40% or 50% reduction is often achieved, in some cases even more. By reducing the surface area, the adsorption and absorption of water and admixtures, respectively, are lowered. As a result the water demand, i.e. the volume of water needed for achieving the desired fluidity, and the amounts of admixtures required decrease.

After burning, the supplementary cementitious material obtained is typically cooled. It can be cooled rapidly in order to prevent a phase transformation or crystallization, for example. Normally, rapid cooling is not mandatory.

The fact that the material according to the invention has an essentially grey colouration, i.e. is neither strongly red nor strongly blue coloured, is a major advantage. The experimentally determined colour values according to the CIE Lab System are generally L from 30 to 80, a from 0 to 10, and b from 0 to 30. Of particular importance is the a value, which should preferably be from 0 to at most 5 and in particular around 0.

For use, the supplementary cementitious material is generally ground to a fineness of 2000 to 10,000 cm$^2$/g (according to Blaine), preferably 3500 to 8000 cm$^2$/g, and especially preferred 3500 to 8000 cm$^2$/g. The grinding can be carried out separately or together with the other cement and binder constituents. A combined grinding has proven especially suitable.

The specific surface area of the ground supplementary cementitious material is typically at a $d_{90}$<150 µm, preferably at a $d_{90}$<90 µm, and especially preferred at a $d_{90}$<60 µm.

The final binder is present in typical cement finenesses, depending on the production.

Preference is given to using grinding aids in the grinding of the raw powder mixture and/or of the supplementary cementitious material. The grinding aids are preferably, but not exclusively, chosen from the group consisting of glycols and alkanolamines, in particular but not exclusively diethanolisopropanolamine (DEIPA), triisopropanolamine (TIPA), and/or triethanolamine (TEA), and also from the group consisting of the alkyl dialkanolamines such as methyl diisopropanolamine, as well as mixtures thereof.

The supplementary cementitious material according to the invention can (like fly ash and granulated blast furnace slag, for example) be used as a SCM.

To this end, it is combined with cement to form a binder. The supplementary cementitious material and the cement can be ground separately or together, with or without sulphate. The binder can furthermore contain admixtures and/or additives, which are known per se and used in the standard amounts.

Portland cement and calcium sulphoaluminate cement are especially suitable as a cement. Use can also be made of calcium aluminate cement. The use of so-called geopolymer cements makes little sense economically. As a rule Portland cement, also designated OPC, comprises from 50 to 70 wt % $C_3S$, from 10 to 40 wt % $C_2S$, from 0 to 15 wt % $C_3A$, from 0 to 20 wt % $C_4AF$, from 2 to 10 wt % C$·xH, from 0 to 3 wt % C, and from 0 to 5 wt % Cc ($CaCO_3$). As a rule the chemical composition is 55-75 wt % CaO, 15-25 wt % $SiO_2$, 2-6 wt % $Al_2O_3$, 0-6 wt % $Fe_2O_3$, and 1.5-4.5 wt % $SO_3$. As a rule calcium sulphoaluminate cement, also designated CSA or C$A, contains from 10-75 wt % $C_4A_3$$, from 5-30 wt % C$, from 0-30 wt % $C_4AF$, from 0-30 wt % calcium aluminate, and from 2-70 wt % $C_2S$ and/or $C_5S_2$$. Depending upon the raw material mixture and the production conditions, variants such as belite-calcium sulphoaluminate cement (BCSA or BCSAF) with an increased belite content of at least 10 or 20 wt % and ternesite (belite) calcium sulphoaluminate cement (T(B)CSA or T(B)CSAF) with a content of 5 up to more than 50 wt % $C_5S_2$$ can be obtained in a targeted manner.

Using 1 to 90 wt %, preferably 10 to 70 wt %, and in particular 20 to 50 wt % cement and 10 to 99 wt %, preferably 30 to 90 wt %, and in particular 50 to 80 wt % SCM according to the invention in the binder has proved to be effective. In addition, the binder preferably contains up to 10 wt %, especially preferred 1 to 7 wt %, and in particular 2 to 5 wt % sulphate carrier. The sulphate carrier may in some cases also already be present, either wholly or partially, in the SCM produced according to the invention.

The sulphate carrier is preferably mostly or exclusively calcium sulphate or a mixture of calcium sulphates.

Admixtures can also be added to the binder, preferably during processing, either in the amounts known per se or in amounts necessary for compensating remaining adsorption or absorption.

For example, one or several setting and/or hardening accelerators, preferably chosen from among aluminium salts and aluminium hydroxides, calcium (sulpho) aluminates, lithium salts and lithium hydroxides, other alkaline salts and alkali hydroxides, alkali silicates, and mixtures thereof can be contained, in particular chosen from among $Al_2(SO_4)_3$, AlOOH, $Al(OH)_3$, $Al(NO_3)_3$, $CaAl_2O_4$, $Ca_{12}Al_{14}O_{33}$, $Ca_3Al_2O_6$, $Ca_4Al_6O_{12}(SO_4)$, LiOH, $Li_2CO_3$, LiCl, NaOH, $Na_2CO_3$, $K_2Ca_2(SO_4)_3$, $K_3Na(SO_4)_2$, $Na_2Ca(SO_4)_3$, $K_3Na(SO_4)_2$, $K_2Ca(SO_4)_2$—$H_2O$, $Li_2SO_4$, $Na_2SO_4$, $K_2SO_4$, KOH and water glass. Alkali sulphate-based setting and/or hardening accelerators may also in some cases already be (partially) present in the SCM produced according to the invention.

It is further preferred if concrete plasticizers and/or water reducing agents and/or retarders are contained. Examples of suitable ones include those based on lignin sulphonates; sulphonated naphthalene, melamine, or phenol formaldehyde condensate; or ones based on acrylic acid-acrylamide mixtures or polycarboxylate ethers or ones based on phosphated polycondensates; based on phosphated alkyl carboxylic acids and salts thereof; based on (hydroxy-)carboxylic acids and carboxylates, in particular citric acid, citrates, tartaric acid, tartrates; borax, boric acid and borates, oxalates; sulphanilic acid; amino-carboxylic acids; salicylic acid, and acetylsalicylic acid; dialdehydes and mixtures thereof.

The binder can furthermore contain additives, e.g., rock flour, in particular limestone and/or dolomite, precipitated (nano) $CaCO_3$, magnesite, pigments, fibres, etc. In addition, SCMs known per se, in particular granulated blast furnace slag, fly ash, $SiO_2$ in the form of silica fume, microsilica, pyrogenic silica, etc., can be contained. The total amount of these additives is preferably 40 wt % max., preferably 5 to 30 wt %, and particularly preferably 10 to 20 wt %.

Naturally the sum of all constituents in a mixture, e.g., in a binder or in a starting material, is always 100 wt %.

If it possesses latent hydraulic properties, the supplementary cementitious material can also be combined with an activator to form a cement. Similarly to granulated blast furnace slag, the supplementary cementitious material can hydraulically harden like cement when its latent hydraulic properties are activated.

In contrast to binders known as Roman cement, the supplementary cementitious material according to the invention aims at aluminium- and/or silicon-containing hardening phases. Accordingly, it is logical to use aluminium- and/or silicon-releasing constituents as activators, examples of which include, but are not limited to $Al_2(SO_4)_3$, $Al(OH)_3$, and calcium aluminates such as CA, $C_3A$, and $C_{12}A_7$, and furthermore nano- or microsilica, water glass, and mixtures thereof.

The activator or activators is/are used in amounts ranging from 0.1 to 5 wt %, preferably from 0.5 to 3 wt %, and especially preferred from 1 to 2 wt %, based on the amount of the supplementary cementitious material.

With such a binder made of supplementary cementitious material and activators, admixtures and additives can also be used in a manner known per se, as described above.

With the binders according to the invention containing cement and the supplementary cementitious material according to the invention, if need be it is furthermore possible to add an activator of the type and in the amount described above in order to achieve an accelerated reaction.

Construction materials such as concrete, mortar, screed, construction chemical compositions (e.g., tile cement, . . . ) can be obtained from the binders. An advantage of the invention lies in the fact that the supplementary cementitious material produced according to the invention is very reactive; construction materials produced therefrom have properties comparable to construction materials produced from Portland cement.

The invention also relates to all combinations of preferred embodiments, provided that they are not mutually exclusive. When "about" or "ca." are used in connection with a numerical figure, this means that values that are at least 10% higher or lower, or values that are 5% higher or lower, and in any case values that are 1% higher or lower are included. Unless stated otherwise or the context dictates otherwise, percentages are based on the weight, in case of doubt on the total weight, of the mixture.

The invention shall be explained using the following examples, but without being limited to the specifically described embodiments.

In the examples, a clay was used as an aluminium silicate constituent and burned alone or with addition of dolomite at different temperatures. The products were used as SCMs in order to determine reactivity. To this end, binders were produced that contained 56.5 wt % Portland cement clinkers (OPC), 3.5 wt % anhydrite and 40 wt % of a supplementary cementitious material or 40 wt % limestone as a comparison, and the compressive strength was determined after 7 and 28 days according to EN 196. Deviating from the standard, the binder was mixed with a fine sand in a 2:3 ratio, and a water-cement ratio of 0.55 was used. Compressive strength was measured on cubes with an edge length of 20 mm and a feed rate of 400 N/s. All supplementary cementitious materials and the limestone were ground with the same grinding energy in order to make the results comparable. The processability (flow properties and water demand) was comparable for all supplementary cementitious materials.

The starting materials had the oxide compositions (LOI 1050=loss on ignition at 1050° C.) given in Table 1, all amounts in wt %.

TABLE 1

|  | Anhydrite | Clinker | Limestone | Dolomite | Clay 1 | Clay 2 |
| --- | --- | --- | --- | --- | --- | --- |
| LOI 1050 | 3.68 | 0.29 | 42.57 | 46.73 | 12.94 | 15.16 |
| $SiO_2$ | 2.04 | 20.86 | 1.75 | 0.18 | 47.73 | 31.34 |
| $Al_2O_3$ | 0.60 | 4.88 | 0.46 | 0.07 | 28.86 | 9.73 |
| $TiO_2$ | 0.03 | 0.37 | 0.02 | 0.00 | 1.04 | 0.42 |
| MnO | 0.00 | 0.05 | 0.02 | 0.00 | 0.00 | 0.02 |
| $Fe_2O_3$ | 0.23 | 3.67 | 0.20 | 0.03 | 8.15 | 3.77 |
| CaO | 38.32 | 63.52 | 53.93 | 32.71 | 0.03 | 20.34 |
| MgO | 1.45 | 2.57 | 0.55 | 18.99 | 0.26 | 4.06 |
| $K_2O$ | 0.16 | 1.09 | 0.07 | 0.01 | 0.49 | 3.92 |
| $Na_2O$ | 0.00 | 0.55 | 0.00 | 0.00 | 0.02 | 0.03 |
| $SO_3$ | 52.24 | 1.22 | 0.03 | 0.00 | 0.00 | 11.01 |
| $P_2O_5$ | 0.02 | 0.26 | 0.04 | 0.01 | 0.08 | 0.06 |
| Sum | 98.76 | 99.34 | 99.65 | 98.74 | 99.60 | 99.86 |

Clay 1 had a $N_2$-BET surface area of 42.11 m²/g. The phase compositions of the clay used were determined using x-ray diffractometry (XRD) and then verified using thermal gravimetric analysis (TGA).

Accordingly, clay 1 contained kaolinite and quartz as main phases, goethite and montmorillonite as minor phases, as well as traces of illite and opal. The classification (main and minor phases, traces) was estimated and is not a quantitative determination. A majority of the sample was in the form of an x-ray amorphous fraction. A precise quantification/determination of the phase composition of such complex systems is extremely difficult.

Example 1

The clay 1-dolomite mixture was burned under reducing conditions and for comparison under oxidizing conditions. Three burning temperatures and two materials, namely a 66% dolomite-34% clay mixture as well as the clay alone for comparison, were tested. The two samples were each burned directly for one hour at 700° C., 800° C. or 900° C. The reducing atmosphere was established by using ground coal. To this end, the coal dust was transferred to a large (250 ml) crucible and then the sample in a small (30 ml) crucible was placed into the larger one. The container was then closed with a lid.

The burned samples underwent a subjective colour characterization. The results are given in Table 3. The corresponding values of the L*a*b* colour space and according to CMYK are given in parentheses ( ) and brackets [ ], respectively. This classification was performed subjectively.

TABLE 3

| Material, | Burning temperature [° C.] | | |
| --- | --- | --- | --- |
| conditions | 700 | 800 | 900 |
| Clay, oxidizing | | Red (50 36.6 45) [7 84 92 1] | |
| Clay, reducing | | Grey, slightly brownish (70 0 0) to (80 0 20) [26 20 2 2] to [15 15 40 1] | Grey (30 0 0) [53 43 44 29] |
| Mixture, oxidizing | Red (50 38.3 32.1) [18 72 76 7] | | Red (50 46 38.6) [13 78 84 3] |
| Mixture, reducing | Grey, slightly brownish (60 0 0) to (60 10 17.3) [36 28 31 8] to [25 39 50 15] | Light grey (70 0 0) [26 20 22 2] | Light grey, slightly yellowish (80 0 0) to (80 0 30) [14 10 13 0] to [14 15 50 1] |

It is clear that the method according to the invention is suitable for systematically improving the colouration of the product that is produced. It is furthermore evident that compared to pure clay, a broader spectrum of colours can be achieved with burning under reducing conditions. It is possible to produce materials that are considerably lighter in colour. At all temperatures tested, it was possible to avoid a brown and/or red colouration. Compared to pure clay, in addition to the burning temperature the colouration can be systematically varied by the selection of the composition of the mixture, wherein the reactivity of the SCM in the final binder mix is still retained. Furthermore, the advantage arises that, compared to pure burnt clay, the combined burning of clay and dolomite leads to an increased reactivity of the SCM that is produced. This surprising positive effect manifests itself precisely at temperatures above 900° C.

Example 2

Analogously to example 1 the following mixtures were burnt and examined:
mix 1: 50% dolomite and 50% clay 1—$(SiO_2+Al_2O_3)/(CaO+MgO)$ about 1.5
mix 2: 50% limestone and 50% clay 1—$(SiO_2+Al_2O_3)/(CaO+MgO)$ about 1.4
mix 3: 73% dolomite and 27% clay 1—$(SiO_2+Al_2O_3)/(CaO+MgO)$ about 4.0
mix 4: 74% limestone and 26% clay 1—$(SiO_2+Al_2O_3)/(CaO+MgO)$ about 4.0
mix 5: clay 2—$(SiO_2+Al_2O_3)/(CaO+MgO)$ about 1.7

The colour that was determined for each mixture is summarized in table 4.

TABLE 4

| | burning temperature | |
|---|---|---|
| | 825° C. | 950° C. |
| mix 1, reducing | brown, slightly yellowish (80 13.7 37.6) [0 27 54 0] | brown, slightly yellowish (70 0 20) [26 24 48 6] |
| mix 2, reducing (comparison) | brown, slightly reddish (60 20 34.6) [22 45 61 11] | brown, reddish *(60 0 50)*[31 31 93 14] |
| mix 3, reducing | brown, slightly reddish (60 5 8.7) [32 35 42 15] | brown, slightly yellowish (60 0 20) [34 31 69 14] |
| mix 4, reducing (comparison) | reddish (50 23 19.3) [25 60 59 18] | brown, slightly yellow (60 0 20) [35 31 57 14] |
| mix 5, reducing | brown, slightly reddish (60 17.1 47) [19 46 85 8] | brown to grey (70 0 50) [43 38 66 25] |
| mix 5, oxidizing (comparison) | brown, reddish (60 30 52) [11 57 91 2] | brown, slightly reddish (70 20 34.6) [7 41 60 1] |

The results reveal that all samples with dolomite show a slightly brighter colour compared to samples based on calcite. This indicates that the release of reactive MgO due to the two step decomposition of dolomite (i.e. 1st from 600 to 800° C. decomposition of dolomite and formation of secondary calcite) enables the binding/consumption of iron by its incorporation into new magnesium (+/−) calcium bearing phases.

In addition, at elevated temperatures of 950° C. and even in the not optimized condition (lab furnace trial, reducing conditions were simulated by the addition of coal which is not the achievable optimum) the reddish colour was fully avoided. Based on the literature and own experiments the calcination of clays alone or blends with limestone strongly reduced the activity index of the aluminium silicate material. In contrast, mixtures with dolomite are less sensitive towards high temperatures (or even become better, depending on the used aluminium silicate), i.e. maintain an almost constant activity index. This example shows that also for a higher and a lower ratio $(SiO_2+Al_2O_3)/(CaO+MgO)$ of 4.0 and 1.5 as compared to the 2.8 in example 1 a significant improvement of colouration is achieved for mixtures with dolomite instead of limestone. Especially for high burning temperatures that are desired to reduce the surface area of the aluminium silicate constituent the colouration is improved as shown by mix 5.

What is claimed is:

1. A method for producing a latent hydraulic and/or pozzolanic supplementary cementitious material, including adjustment of the colour thereof, comprising the steps:

Provision of a starting material containing an aluminium silicate constituent and a dolomite constituent and having a ratio $(SiO_2+Al_2O_3)/(CaO+MgO)$ from 0.7 to 6,
   Conversion of the starting material to the supplementary cementitious material by burning the starting material under reducing conditions in the temperature range of >700° C. to 1100° C. if no mineralisers are contained, and in the temperature range of 625° C. to 950° C. if mineralisers are contained.

2. The method according to claim 1, wherein the starting material is obtained by mixing and combination grinding of dolomite constituents and aluminium silicate constituents.

3. The method according to claim 2, wherein before or during the grinding, one or several grinding aids are added, which are chosen from the group consisting of glycols, alkanolamines, alkyl dialkanolamines, and mixtures thereof.

4. The method according to claim 1, wherein a mixture containing 40 to 80 wt % aluminium silicate constituent and 20 to 60 wt % dolomite constituent is used as a starting material.

5. The method according to claim 1, wherein the starting material, calculated on a loss on ignition-free basis, contains at least 5 wt % MgO occurring as carbonate.

6. The method according to claim 1, wherein the starting material, calculated on a loss on ignition-free basis, contains at least 8 wt % $Al_2O_3$.

7. The method according to claim 1, wherein the starting material, calculated on a loss on ignition-free basis, contains at least 15 wt % $SiO_2$.

8. The method according to claim 1, wherein the starting material is burned in a directly or indirectly fired rotary kiln, shaft kiln, or multi-deck oven for 5 to 240 minutes under reducing conditions.

9. The method according to claim 1, wherein the starting material is burned in a fluidized-bed reactor or in a flash calciner for 5 to 300 seconds.

10. The method according to claim 1, wherein the reducing conditions are established by adding carbon, carbon monoxide, organic compounds, ammonia, sulphur, or methane and/or by choosing an appropriate amount of fuel and/or by minimizing an oxygen input.

11. The method according to claim 1, wherein the supplementary cementitious material is ground to a fineness of 2000 to 10,000 cm²/g (Blaine).

12. The method according to claim 11, wherein before or during grinding, one or several grinding aids are added, which are chosen from the group consisting of glycols, alkanolamines, alkyl dialkanolamines, and mixtures thereof.

13. The method according to claim 1, wherein the starting material does not contain any mineralisers and is burned at 825° C. to 1000° C.

14. The method according to claim 1, wherein the starting material contains one or several mineralisers and is burned at 675° C. to 900° C.

15. The method according to claim 14, wherein the mineraliser or mineralisers is/are chosen from the group consisting of borax, waste glass, iron salts, alkaline salts and/or alkaline earth salts.

16. The method according to claim 4, wherein the starting material, calculated on a loss on ignition-free basis, contains at least 7 wt.-% MgO, at least 15 wt.-% $Al_2O_3$ and at least 25 wt.-% $SiO_2$.

17. The method according to claim 2, wherein the starting material does not contain any mineralisers and is burned at 850° C. to 975° C.

18. A binder comprising
a ground supplementary cementitious material, obtained according to claim 11, and
at least one cement, which is selected from among Portland cement, calcium sulphoaluminate cement, and calcium aluminate cement, and/or
at least one activator, which releases aluminium and/or silicon in the form of ions.

19. The binder according to claim 18, wherein it contains from 1 to 90 wt % cement or activator and from 10 to 99 wt % supplementary cementitious material.

20. The binder according to claim 18, wherein it contains an additional sulphate carrier.

21. The binder according to claim 18, wherein one or several setting and/or hardening accelerators, chosen from the group consisting of aluminium salts and aluminium hydroxides, calcium (sulpho) aluminates, alkaline salts and alkali hydroxides, alkali silicates, and mixtures thereof, are contained.

22. The binder according to claim 18, wherein it contains one or several activators in an amount of 0.1 to 5 wt % based on the amount of the supplementary cementitious material.

23. The binder according to claim 18, wherein concrete plasticizers and/or water reducing agents and/or retarders are contained.

24. The binder according to claim 18, wherein it contains from 20 to 50 wt.-% cement and from 50 to 80 wt.-% supplementary cementitious material.

25. The binder according to claim 20, wherein it contains from 2 to 5 wt.-% calcium sulphate or a mixture of calcium sulphates.

* * * * *